(12) United States Patent
Bhatnagar (10) Patent No.: US 8,213,307 B2
(45) Date of Patent: Jul. 3, 2012

(54) RESOURCE ALLOCATION IN WIRELESS COMMUNICATION NETWORK

(75) Inventor: Shalabh Bhatnagar, Bangalore (IN)

(73) Assignee: Indian Institute of Science, Bangalore, Karnataka (IN)

( * ) Notice: Subject to any disclaimer, the term of this patent is extended or adjusted under 35 U.S.C. 154(b) by 450 days.

(21) Appl. No.: 12/510,246

(22) Filed: Jul. 27, 2009

(65) Prior Publication Data

US 2010/0272073 A1 Oct. 28, 2010

(30) Foreign Application Priority Data

Apr. 23, 2009 (IN) .......................... 943/09

(51) Int. Cl.
*G01R 31/08* (2006.01)
(52) U.S. Cl. .................. 370/230; 370/346; 370/449
(58) Field of Classification Search .................. 370/238, 370/312, 329–338, 442–444, 449–457, 458–461, 370/230–234, 346–350; 455/41.2, 450–460
See application file for complete search history.

(56) References Cited

OTHER PUBLICATIONS

Reddy G. Ramana, Bhatnagar Shalabh, Rakesh V. and Prakash Chaturvedi Vijay, "An Efficient algorithm for Scheduling in Bluetooth Piconets and Scatternets", Wireless Networks, Copyright Springer Science+Business Media, LLC 2009, pp. 1-18.

*Primary Examiner* — Pao Sinkantarakorn
*Assistant Examiner* — Iqbal Zaidi
(74) *Attorney, Agent, or Firm* — Ren-Sheng International (57) ABSTRACT

Embodiment of the disclosure set forth resource allocation in a wireless network. Some example methods include selecting a node based on probability of having available data at the node, sending an inquiry to the node, deriving a first set of average cost estimates based on a first step-size function, network information measured at the node, and a predetermined value, calculating a second set of threshold values based on a second step-size function and the first set of average cost estimates, updating the second set of values to generate a third set of threshold values based on the predetermined value, and allocating resources for the node based on the third set of threshold values.

20 Claims, 6 Drawing Sheets

400 A computer program product 402 at least one of one or more instructions for selecting a node based on probability of having available data at the node;

one or more instructions for sending an inquiry to the node;

deriving a first set of average cost estimates based on a first step-size function, network information measured at the node, and a predetermined value;

one or more instructions for calculating a second set of threshold values based on a second step-size function and the first set of average cost estimates;

One or more instructions for updating the second set of threshold values to generate a third set of threshold values based on the predetermined value;

One or more instructions for allocating resources for the node based on the third set of threshold values; or One or more instructions for updating the predetermined value.

| 404 a signal bearing medium | 406 a communication medium |
| 408 a computer readable medium | 410 a recordable medium |

RESOURCE ALLOCATION IN WIRELESS COMMUNICATION NETWORK

CROSS-REFERENCE TO RELATED APPLICATIONS

This application claims priority to Indian Patent Application 943/CHE/2009, filed on Apr. 23, 2009.

BACKGROUND

In a wireless communication network, data can be exchanged among multiple nodes. Resources are allocated among these multiple nodes to facilitate the data exchanges. For example, a number of time slots are allocated to a node configured to receive or transmit information based on the network traffic at the node. There are existing approaches that attempt to advance the resource allocation in a wireless communication network to reduce transmission delay of the wireless communication network. However, many of these approaches are limited to certain network environments.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and networks related to resource allocation in a wireless network.

In this disclosure, a "master node" refers to a node configured to control the traffic in a network. A "slave node" refers to a node configured to receive an inquiry from a master node. The term "poll" or "polling" broadly refers to a master node sending an inquiry to a slave node for certain network information before the slave node is able to transmit data. The term "LAST" corresponds to the most recent.

In this disclosure, a wireless communication network including at least one master node and at least one slave node may be implemented by a short range wireless technology, such as Bluetooth. In the wireless communication network, the at least one master node and the at least one slave node share a physical radio channel. The physical radio channel is divided into time units, which are also referred to as time slots. A master node is configured to discover a slave node within a range. In some implementations, the master node can be, without limitation, a mobile device, a cell phone, a smart phone, a laptop computer, a personal digital assistant (PDA), a mobile internet device (MID), and a portable media player. After discovering a slave node within the range, the master node pages the discovered slave node, and then the master node establishes a connection with the slave node. With the established connection, the master node can poll the slave node to collect network information associated with the slave node. The network information may include, without limitation, the IP address of the slave node, time stamp information associated with the slave node, and the queue length of data at the slave node. The data stored in the queue can be included in a packet to be transmitted from the slave node to the master node. The master node allocates resources based on the obtained network information of the slave node. For example, the master node is configured to assign time slots for the slave node to transmit or receive one or more packets.

Figure 1A:
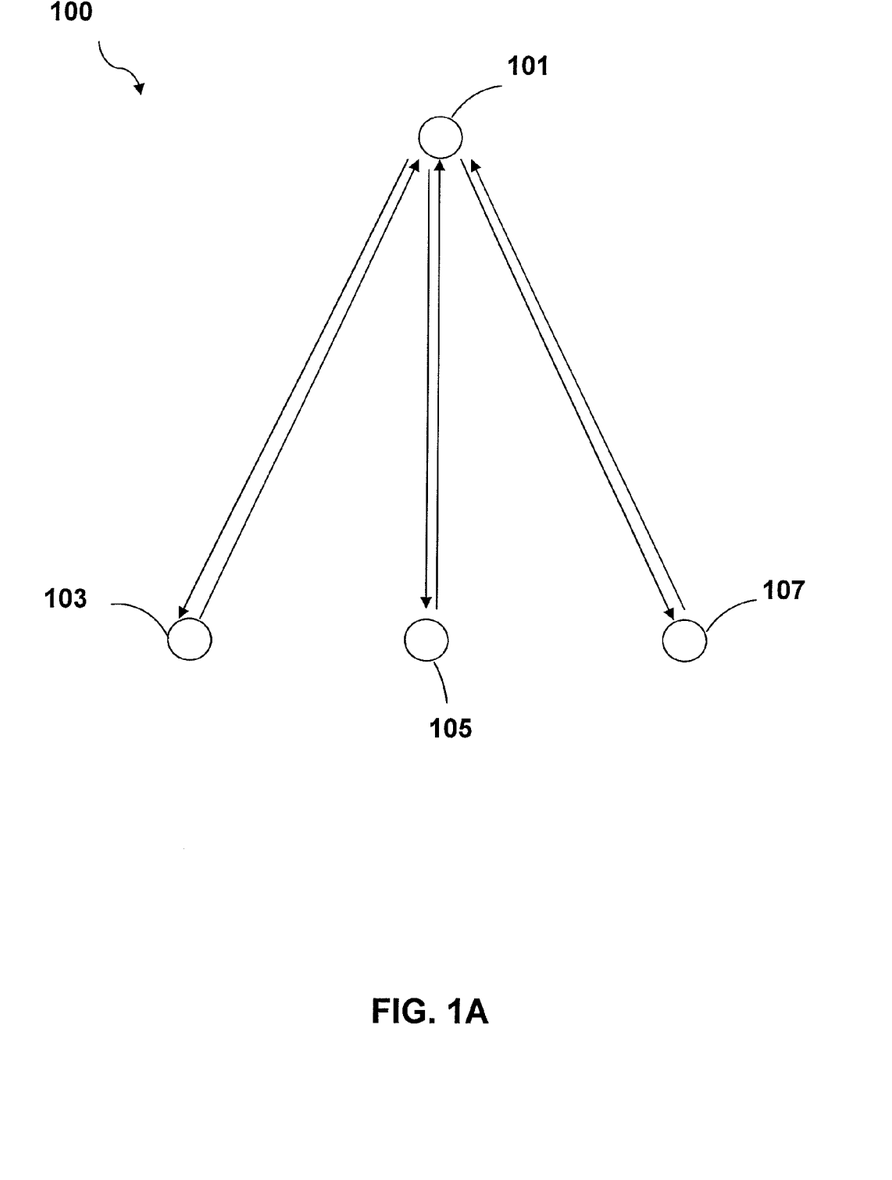
FIG. 1A illustrates one example configuration of a wireless communication network.

FIG. 1A illustrates one example configuration of a wireless communication network 100, arranged in accordance with at least some embodiments of the present disclosure. The wireless communication network 100 includes a master node 101 and multiple slave nodes (e.g., a first slave node 103, a second slave node 105, and a third slave node 107). In some implementations, the master node 101 polls the first slave node 103 to collect the network information associated with the first slave node 103. The first slave node 103 responds to the poll, and the master node 101 allocates resources for the first slave node 103 based on the network information.

In the event that the master node 101 polls a first slave node having no data to be transmitted or received, the master node 101 then polls a second slave node after the first slave node responds to the first poll. When the second slave node has data to be transmitted, the data transmission for the second slave node is delayed, because the master node first polls the first slave node having no data thereon. In some implementations of the present disclosure, the master node 101 is configured to poll a slave node based on certain parameters such as, without limitation, the estimated probability of data being at the slave node and the number of time slots assigned to the slave node since last poll of the slave node. After polling the slave node, the master node 101 is further configured to allocate resources for the polled slave node.

Figure 1B:
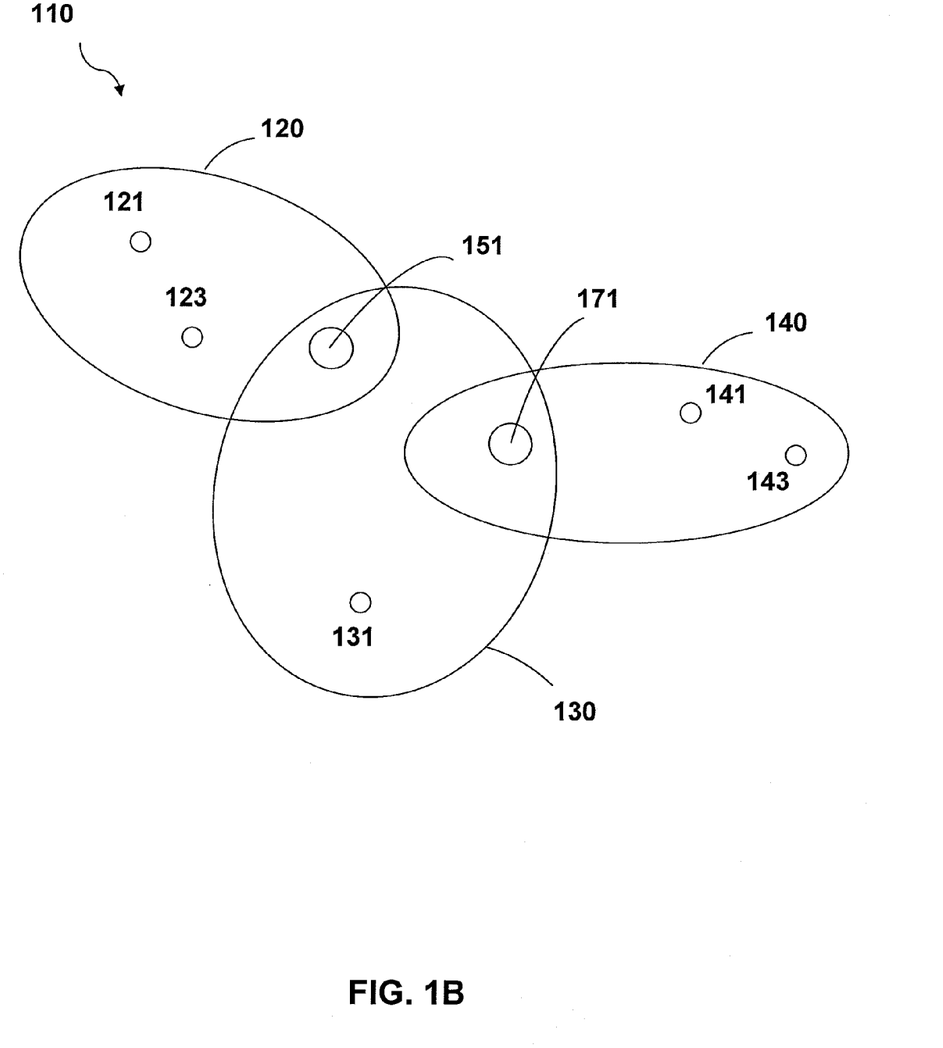
FIG. 1B illustrates one example configuration of another wireless communication network including multiple secondary wireless communication networks.

FIG. 1B illustrates one example configuration of a wireless communication network 110 including multiple secondary wireless communication networks, arranged in accordance with at least some embodiments of the present disclosure. The wireless communication network 110 includes a first secondary wireless communication network 120, a second secondary wireless communication network 130, and a third secondary wireless communication network 140. A secondary wireless communication network includes one master node and multiple slave nodes. The wireless communication network 110 can be formed when a node of a first secondary wireless communication network elects to participate in a second and separate secondary wireless communication network. A node serving to bridge between two secondary wireless communication networks is referred to as a bridge node. For example, the first bridge node 151 serves to bridge between the first secondary wireless communication network 120 and the second secondary wireless communication network 130. The second bridge node 171 serves to bridge between the second secondary wireless communication network 130 and the third secondary wireless communication network 140, In another embodiment, the first bridge node 151 is configured to select one secondary wireless communication network from multiple secondary wireless communication networks (e.g., the first secondary wireless communication system 120 and the second secondary wireless communication system 130) that the bridge node is a part of. The selection can be based on certain parameters such as, without limitation, a first estimated probability of data being available to be transmitted by the first secondary wireless communication network 120, a second estimated probability of data being available to be transmitted by the second secondary wireless communication network 130, a first number of time slots assigned to the slave nodes in the first secondary wireless communication network 120 since the last poll, and a second number of time slots assigned to the slave nodes in the second secondary wireless communication network 130 since the last poll. The probability associated with having available data on a secondary wireless communication network may be estimated based on the network activity of a node in this secondary wireless communication network. For example, the first bridge node 151 is configured to record the amount of data having traveled through the first bridge node 151 in the first secondary wireless communication network 120 and in the second secondary wireless communication network 130 within a period of time. If the amount of data having moved through the first bridge node 151 in the first secondary wireless communication network 120 exceeds the amount of data having moved through the first bridge node 151 in the second secondary wireless communication network 130, then the first secondary wireless communication network 120 is considered to have higher probability to support high network activity than the second wireless communication network 130 and is thus selected.

After the first bridge node 151 selects the first secondary wireless communication network 120, which is likely to have more data to be transmitted, the master node of the first secondary wireless communication network 120 is configured to poll a slave node of the first secondary wireless communication network 120. Here, the slave node to be polled is more likely to have available data to transmit than other slave nodes in the first secondary wireless communication network 120. After polling such a slave node, the master node of the first secondary wireless communication network 120 is further configured to allocate resources for the polled slave node.

Figure 2:
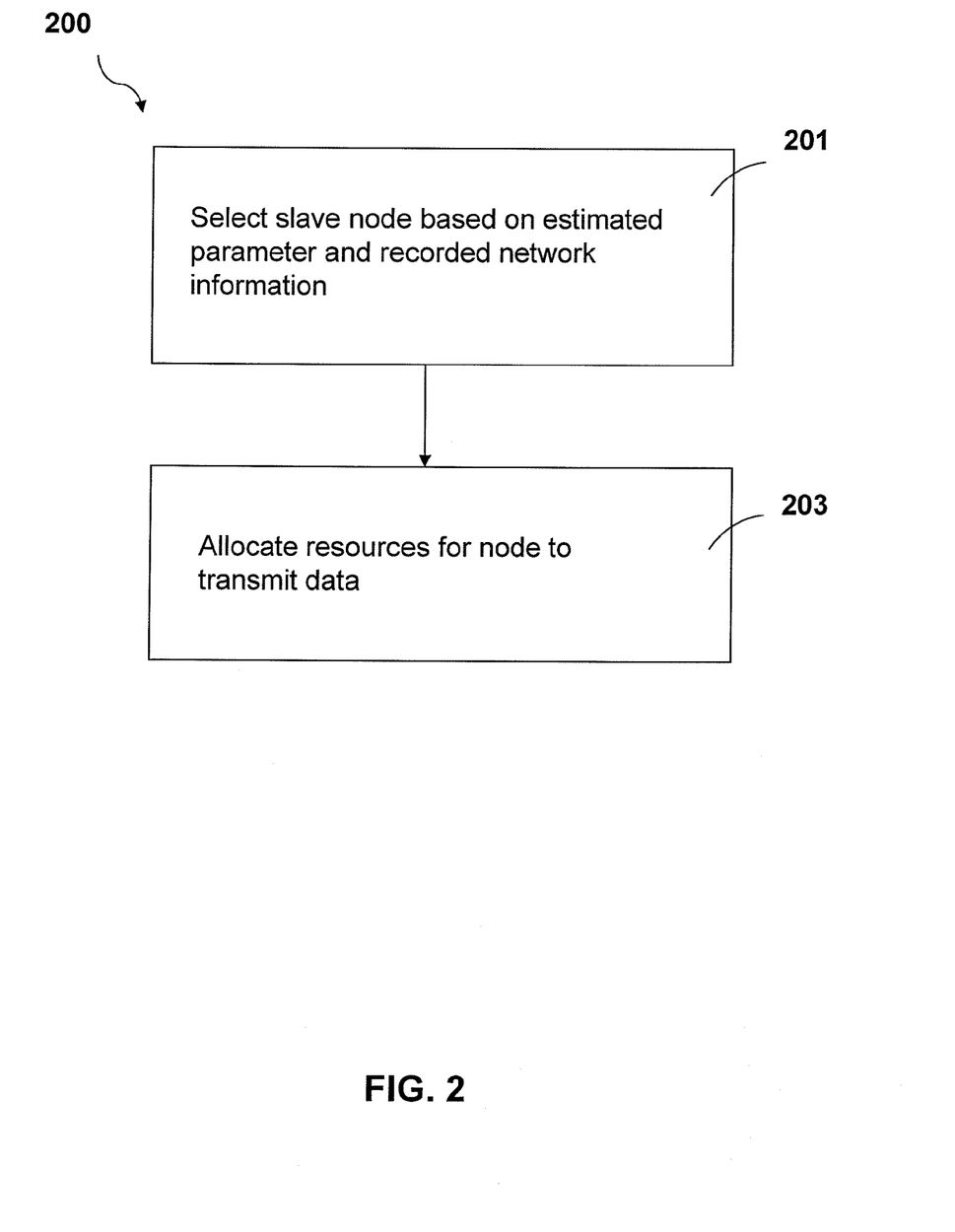
FIG. 2 is a flow chart illustrating an example process for allocating resources among multiple slave nodes in a wireless communication network.

FIG. 2 is a flow chart illustrating an example process for allocating resources among multiple slave nodes in a wireless communication network, arranged in accordance with at least some embodiments of the present disclosure. In operation 201, a master node selects a slave node based on an estimated parameter and recorded network information. The estimated parameter can be the probability of data being available at a particular slave node or the probability of data being available to be transmitted by a secondary wireless communication network in the wireless communication network. The recorded network information may include, without limitation, the number of time slots assigned to a slave node since the last poll of the slave node and the amount of data having traveled through a bridge node.

In some implementations, operation 201 further includes polling the selected slave node in the wireless communication network. Specifically, the master node may be configured to poll the selected slave node based on factors that are associated with a linear combination of a first probability of data being available at the selected slave node and also the number of time slots assigned to the selected slave node since the last poll of the slave node.

In other implementations, operation 201 further includes selecting a secondary wireless communication network among multiple secondary wireless communication networks in the wireless communication network and polling a slave node among multiple slave nodes in the selected secondary wireless communication network. The master node may be configured to select a secondary wireless communication network based on factors that are associated with a linear combination of a second probability of data being available to be transmitted by the secondary wireless communication network and also the number of time slots assigned to the slave nodes in the secondary wireless communication network since the last poll. After the secondary wireless communication network is selected, the master node of the selected secondary wireless communication network may be configured to poll a selected slave node in the selected secondary wireless communication network in a manner as set forth above.

In an example operation 203, the master node is configured to allocate time slots to the polled slave node to transmit data. The number of time slots allocated may depend on the size of the measured queue length at the polled slave node. In some implementations, the allocation can be determined based on the following relationships:

$$I_n = \begin{cases} 1 & \text{if } q_n < N_1 \\ 3 & \text{if } N_1 \leq q_n < N_2 \\ 5 & \text{if } q_n \geq N_2, \end{cases}$$

where $I_n$ is the number of time slots assigned by the master node to the polled slave node; $q_n$ is the queue length measured at the polled slave node; and the $N_1$ and $N_2$ are two variable threshold values that the measured queue length is compared against. In this example, the 1, 3, and 5 time slots are network protocol dependent and are applicable to a Bluetooth wireless communication network.

Figure 3:
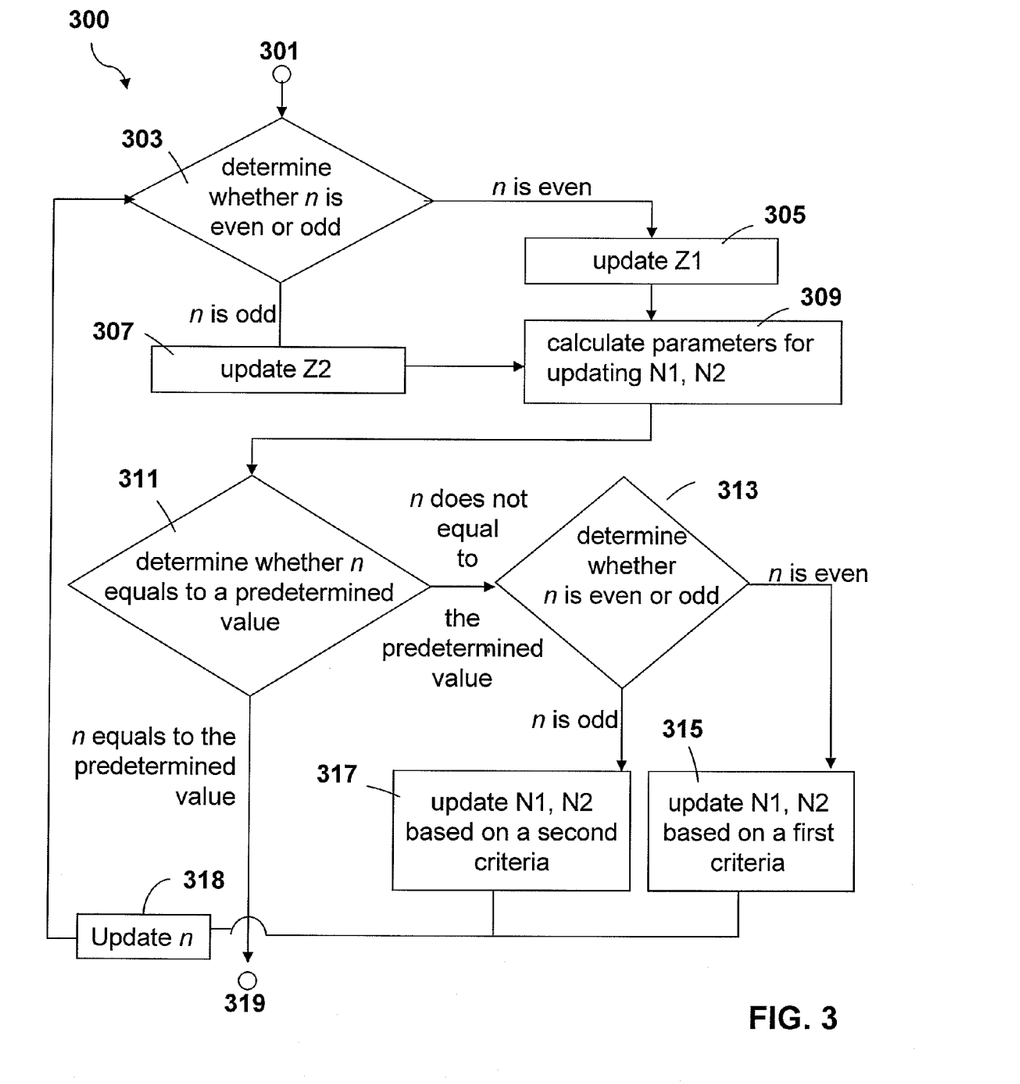
FIG. 3 is a flow chart illustrating an example process of iteratively updating two threshold values to ensure the appropriate resource allocation.

FIG. 3 is a flow chart 300 illustrating an example process for iteratively updating the values of $N_1$ and $N_2$ to ensure the appropriate resource allocation, arranged in accordance with at least some embodiments of the present disclosure. The illustrated process includes multiple paths to update the values of $N_1$ and $N_2$ To select among the different paths, a predetermined rule and a predetermined n value are considered. After having selected a path, the values of $N_1$ and $N_2$ are updated, and the queue length $q_n$ on the polled slave node is measured.

In operation 301, the parameters to be considered in the illustrated process are defined. Some examples of the parameters include, without limitation, a cost function h(.), a first step-size function a(n), a second step-size function b(n), a first random variable $\Delta_1(n)$, and a second random variable $\Delta_2(n)$. In some implementations, a(n)=1/n and b(n) equals to $1/n^a$, where a is in a range between 0.5 and 1 (e.g., 0.8). Initial values of some parameters, such as, without limitation, $\delta$, a(0), b(0), $\Delta_1(0)$, $\Delta_2(0)$, $Z_1(0)$, and $Z_2(0)$, are also defined in this example operation 301. $\delta$ is generally referred to as a gain parameter. $Z_1$ generally refers to an estimate of the average cost for a first set of $N_i$, and $Z_2$ generally refers to an estimate of the average cost for a second set of $N_i$.

In another example operation 303, the value of n is utilized in a first predetermined rule. One example of the first predetermined rule is to see whether n is an even number or an odd number. When n is even, an operation 305 is selected. On the other hand, when n is odd, an operation 307 is selected.

The operation 305 includes updating the value of $Z_1$ based on the LAST value of $Z_1$, the second step-size function b(n), and a cost function of the measured queue length $q_n$. In some implementations, the updating can be based on the equation (1) described below:

$$Z_1 = \text{LAST } Z_1 + \text{LAST } b(n)((h(q_n) - \text{LAST } Z_i)) \quad (1)$$

After the operation 305 is repeated for a predetermined number of times, the value of $Z_1$ is updated, and the value of $Z_2$ is set to equal to the LAST value of $Z_2$.

Similarly, the operation 307 includes updating the value of $Z_2$ based on the LAST value of $Z_2$, the second step-size function b(n), and a cost function of the measured queue length $q_n$. In some implementations, the updating can be based on the equation (2) described below:

$$Z_2 = \text{LAST } Z_2 + \text{LAST } b(n)((h(q_n) - \text{LAST } Z_2)) \quad (2)$$

After the operation 307 is repeated also for the same predetermined number of times, the value of $Z_2$ is updated, and the value of $Z_1$ is set to equal to the LAST value of $Z_1$.

The value of the LAST $Z_1$ and the value of the LAST $Z_2$ are then used in operation 309 to update the values of $N_1$ and $N_2$. In some implementations, the equation that governs the calculation of parameters in operation 309 is shown below:

$$N_i = \Upsilon\left(\text{LAST } N_i - \text{LAST } a(n) \frac{LastZ_1 - LastZ_2}{\delta Last\Delta_i}\right) \; i = 1, 2 \quad (3)$$

where $\tau$ is a projection operator to keep the values of $N_i$ to be within a range between 0 to the buffer size of each queue. In addition, in operation 309, the first random variable $\Delta_1(n)$ and the second random variable $\Delta_2(n)$ are randomly generated to update the LAST $\Delta_1(n)$ and $\Delta_2(n)$.

In operation 311, the value of n is compared with a predetermined value. When n does not equal to the predetermined value, the value of n is utilized in a second predetermined rule to update the values of $N_1$ and $N_2$ in operation 313. Here, the second predetermined rule is also for determining whether n is an even number or an odd number. When n is even, the values of $N_1$ and $N_2$ are updated based on a first set of criteria in operation 315 as shown in the equation (4) below:

$$N_i = \text{LAST } N_i + \delta \text{LAST } \Delta_1(n) \; i=1, 2 \quad (4)$$

On the other hand, when n is odd, the values of $N_1$ and $N_2$ are updated based on a second set of criteria in operation 317 as shown in the equation (5) below:

$$N_i = \text{LAST } N_i \; i=1, 2 \quad (5)$$

In operation 318, n is updated before the illustrated process goes back to the operation 303. In some implementations, n is incremented by one. The operations set forth above continue until the value of n equals to the predetermined value, the illustrated process proceeds to operation 319 to terminate.

With the values of the updated $N_i$, the master node can allocate one, three, or five time slots to the polled slave node according to relationships such as the ones shown and discussed above. In some implementations, the master node is configured to poll another slave node in the wireless communication network or another secondary wireless communication network in the wireless communication network.

Figure 4:
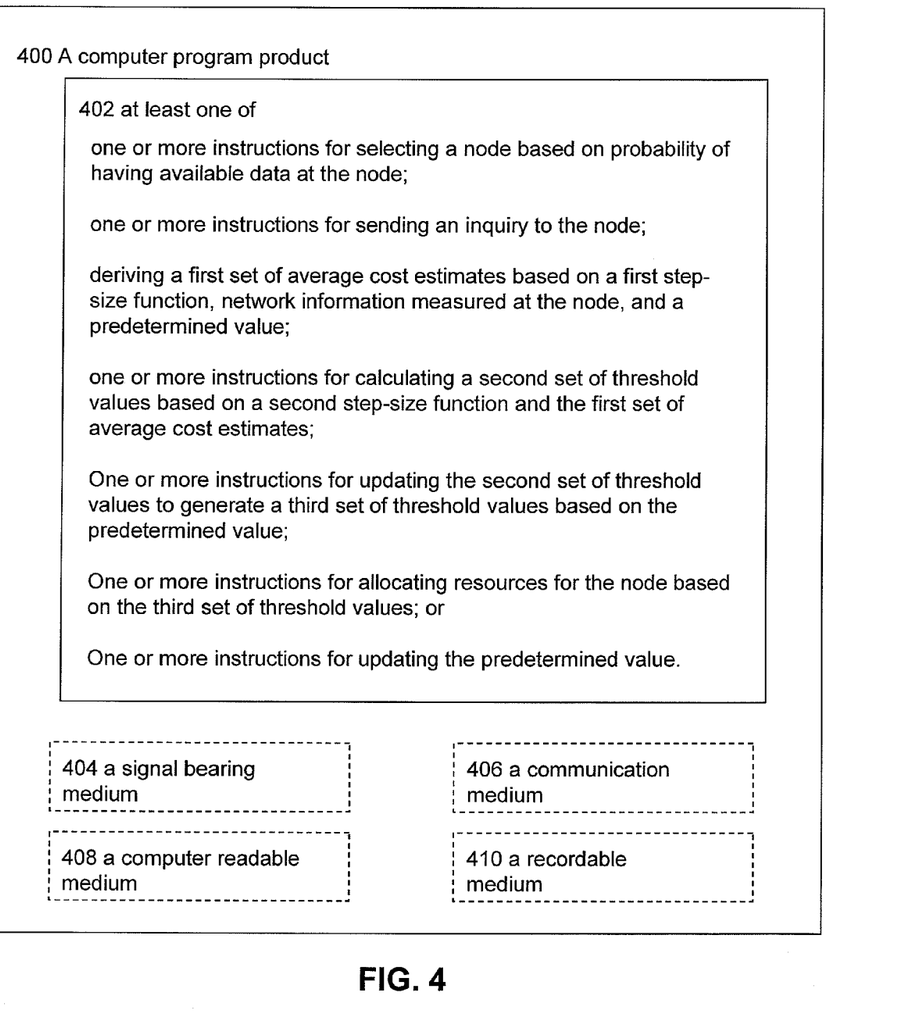
FIG. 4 is a block diagram illustrating an example computer program product of a software module for allocating resources among nodes in a wireless communication network.

FIG. 4 is a block diagram illustrating an example computer program product of a software module for allocating resources among nodes in a wireless communication network, arranged in accordance with at least some embodiments of the present disclosure. Computer program product 400 includes one or more sets of instructions 402 for executing the methods of the software module. Computer program product 400 may be transmitted in a signal bearing medium 404 or another similar communication medium 406. Computer program product 400 may be recorded in a computer readable medium 408 or another similar recordable medium 410.

Figure 5:
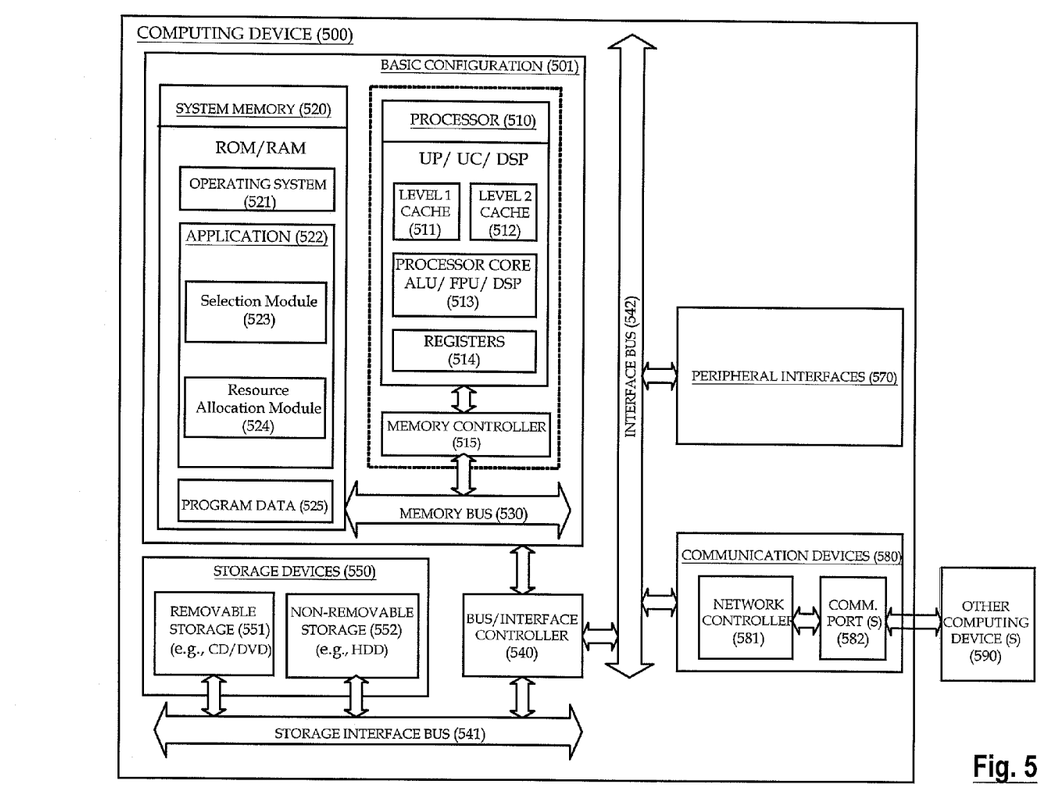
FIG. 5 is a block diagram illustrating an example computing device that is arranged for allocating resources among nodes in a wireless communication network all arranged in accordance with at least some embodiments of the present disclosure.

FIG. 5 is a block diagram illustrating an example computing device that is arranged for allocating resources among nodes in a wireless communication network in accordance with at least some embodiments of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include a selection module 523 and a resource allocation module 524 and operate with program data 525 on an operating system 521. The selection module 523 may be arranged to select a node based on certain program data 525, such as, an estimated parameter and/or recorded network information, and the resource allocation module 524 may be arranged to allocate resources to a node to transmit data.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., peripheral interfaces and communication devices) to the basic configuration 501 via the bus/interface controller 540. Example peripheral interfaces 570 may be configured to communicate with external devices such as input devices. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a master node, a slave node, or a bridge node as described throughout the present disclosure.

There is little distinction left between hardware and software implementations of aspects of networks; the use of hardware or software is generally (but not always, in that in certain contexts the choice between hardware and software can become significant) a design choice representing cost vs. efficiency tradeoffs. There are various vehicles by which processes and/or networks and/or other technologies described herein can be effected (e.g., hardware, software, and/or firmware), and that the preferred vehicle will vary with the context in which the processes and/or networks and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer networks), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing networks. That is, at least a portion of the devices and/or processes described herein can be integrated into a data processing network via a reasonable amount of experimentation. Those having skill in the art will recognize that a typical data processing network generally includes one or more of a network unit housing, a video display device, a memory such as volatile and non-volatile memory, processors such as microprocessors and digital signal processors, computational entities such as operating networks, drivers, graphical user interfaces, and applications programs, one or more interaction devices, such as a touch pad or screen, and/or control networks including feedback loops and control motors (e.g., feedback for sensing position and/or velocity; control motors for moving and/or adjusting components and/or quantities). A typical data processing network may be implemented utilizing any suitable commercially available components, such as those typically found in data computing/communication and/or network computing/communication networks.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a network having at least one of A, B, and C" would include but not be limited to networks that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a network having at least one of A, B, or C" would include but not be limited to networks that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for allocating resources in a wireless communication network, comprising:
   selecting a node based on probability of having available data at the node;
   sending an inquiry to the node;
   deriving a first set of average cost estimates based on a first step-size function, network information measured at the node, and a predetermined value;
   calculating a second set of threshold values based on a second step-size function and the first set of average cost estimates;
   updating the second set of threshold values to generate a third set of threshold values based on the predetermined value;
   allocating resources for the node based on the third set of threshold values; and
   updating the predetermined value.

2. The method of claim 1, wherein the wireless communication network is implemented by a short-range wireless technology.

3. The method of claim 1, wherein the network information includes a queue length at the node.

4. The method of claim 1, further comprising selecting a secondary communication network among multiple secondary communication networks in the wireless communication network.

5. The method of claim 1, wherein the first step-size function is associated with the predetermined value.

6. The method of claim 1, wherein the deriving a first set of average cost estimates further comprising selecting one value from the first set of average cost estimates to operate on according to whether the predetermined value is an even or an odd number.

7. The method of claim 1, wherein the second step-size function is associated with a power of the predetermined value.

8. The method of claim 1, wherein updating the second set of threshold values further comprising selecting one value from the second set of threshold values to operate on based on whether the predetermined value is an even or an odd number.

9. The method of claim 1, wherein the resources correspond to a number of time slots for transmitting or receiving data.

10. The method of claim 9, wherein the number of time slots depends on a short-range wireless technology that the wireless communication network is implemented by.

11. A mobile device configured to allocate resources in a wireless communication network implemented by a short-range wireless technology, comprising:

a processor, wherein the processor is configured to
    select a second mobile device based on probability of having available data at the second mobile device;
    send an inquiry to the second mobile device;
    derive a first set of average cost estimates based on a first step-size function, network information measured at the second mobile device, and a predetermined value;
    calculate a second set of threshold values based on a second step-size function and the first set of average cost estimates;
    update the second set of threshold values to generate a third set of threshold values based on the predetermined value;
    allocate resources for the second mobile device based on the third set of threshold values; and
    update the predetermined value.

12. The mobile device of claim 11, wherein the processor is further configured to select a secondary communication network among multiple secondary communication networks in the wireless communication network.

13. The mobile device of claim 12, wherein the mobile device is a master node of the secondary communication network.

14. The mobile device of claim 13, wherein the second mobile device is a slave node of the secondary communication network.

15. The mobile device of claim 11, wherein the processor is further configured to select one value from the first set of average cost estimates to operate on according to whether the predetermined value is an even or an odd number.

16. The mobile device of claim 11, wherein the processor is further configured to select one value from the second set of threshold values to operate on according to whether the predetermined value is an even or an odd number.

17. The mobile device of claim 11, wherein the processor is further configured to allocate a number of time slots for the second mobile device based on a comparison result between the network information measured at the second mobile device and the third set of threshold values.

18. A non-transitory computer readable medium containing a sequence of instructions for allocating resources in a wireless communication network, which when executed by a mobile device, causes the mobile device to:
    select a second mobile device based on probability of having available data at the second mobile device;
    send an inquiry to the second mobile device;
    derive a first set of average cost estimates based on a first step-size function, network information measured at the second mobile device, and a predetermined value;
    calculate a second set of threshold values based on a second step-size function and the first set of average cost estimates;
    update the second set of threshold values to generate a third set of threshold values based on the predetermined value;
    allocate resources for the second mobile device based on the third set of threshold values; and
    update the predetermined value.

19. The non-transitory computer readable medium of claim 18, further containing a sequence of instructions, which when executed by the mobile device, causes the mobile device to select a secondary communication network among multiple secondary communication networks in the wireless communication network.

20. The non-transitory computer readable medium of claim 18, further containing a sequence of instructions, which when executed by the mobile device, causes the mobile device to allocate a number of time slots for the second mobile device based on a comparison result between the network information measured at the second mobile device and the third set of threshold values.

* * * * *

UNITED STATES PATENT AND TRADEMARK OFFICE
CERTIFICATE OF CORRECTION

| | | |
|---|---|---|
| PATENT NO. | : 8,213,307 B2 | Page 1 of 1 |
| APPLICATION NO. | : 12/510246 | |
| DATED | : July 3, 2012 | |
| INVENTOR(S) | : Bhatnagar | |

It is certified that error appears in the above-identified patent and that said Letters Patent is hereby corrected as shown below:

In Column 3, Line 19, delete "140," and insert -- 140. --, therefor.

In Column 4, Line 63, delete "$N_2$" and insert -- $N_2$. --, therefor.

In Column 5, Line 24, Equation (1), delete "$Z_i$)" and insert -- $Z_1$) --, therefor.

In Column 5, Line 48, delete " $\mathcal{T}$ " and insert -- $Y$ --, therefor.

Signed and Sealed this
Sixth Day of November, 2012

David J. Kappos
*Director of the United States Patent and Trademark Office*